Figure 1:
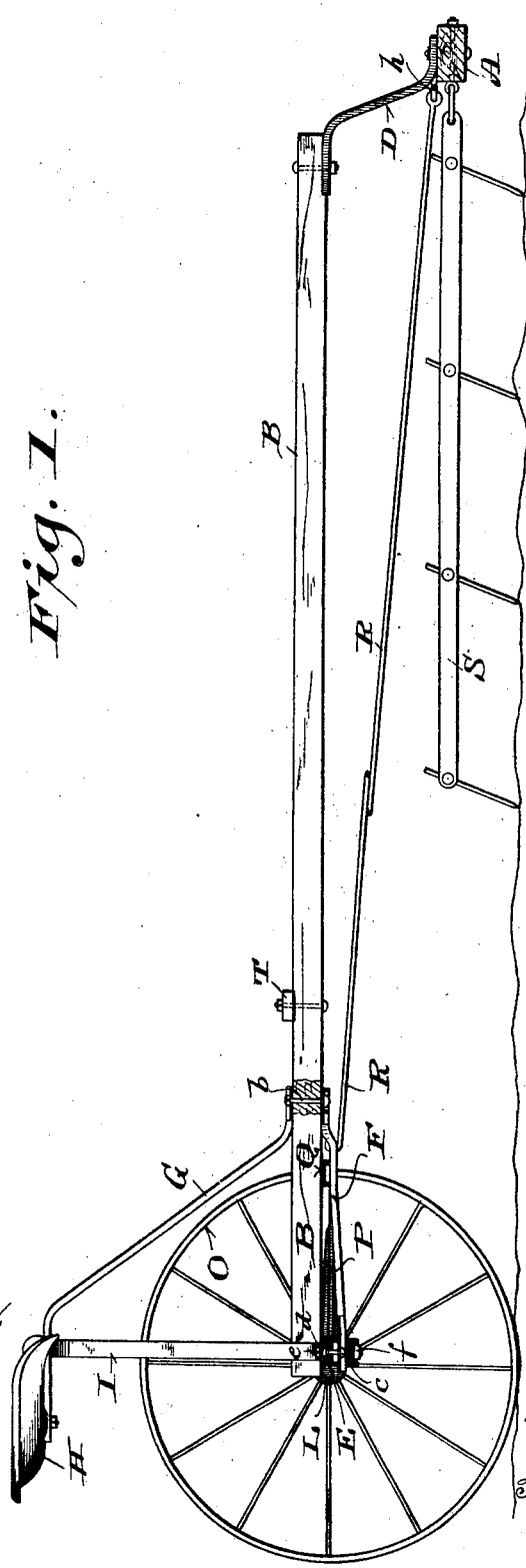

No. 826,867. PATENTED JULY 24, 1906.
M. W. NEUENS.
SULKY ATTACHMENT FOR HARROWS.
APPLICATION FILED NOV. 24, 1905.

3 SHEETS—SHEET 1.

No. 826,867. PATENTED JULY 24, 1906.
M. W. NEUENS.
SULKY ATTACHMENT FOR HARROWS.
APPLICATION FILED NOV. 24, 1905.
3 SHEETS—SHEET 2.
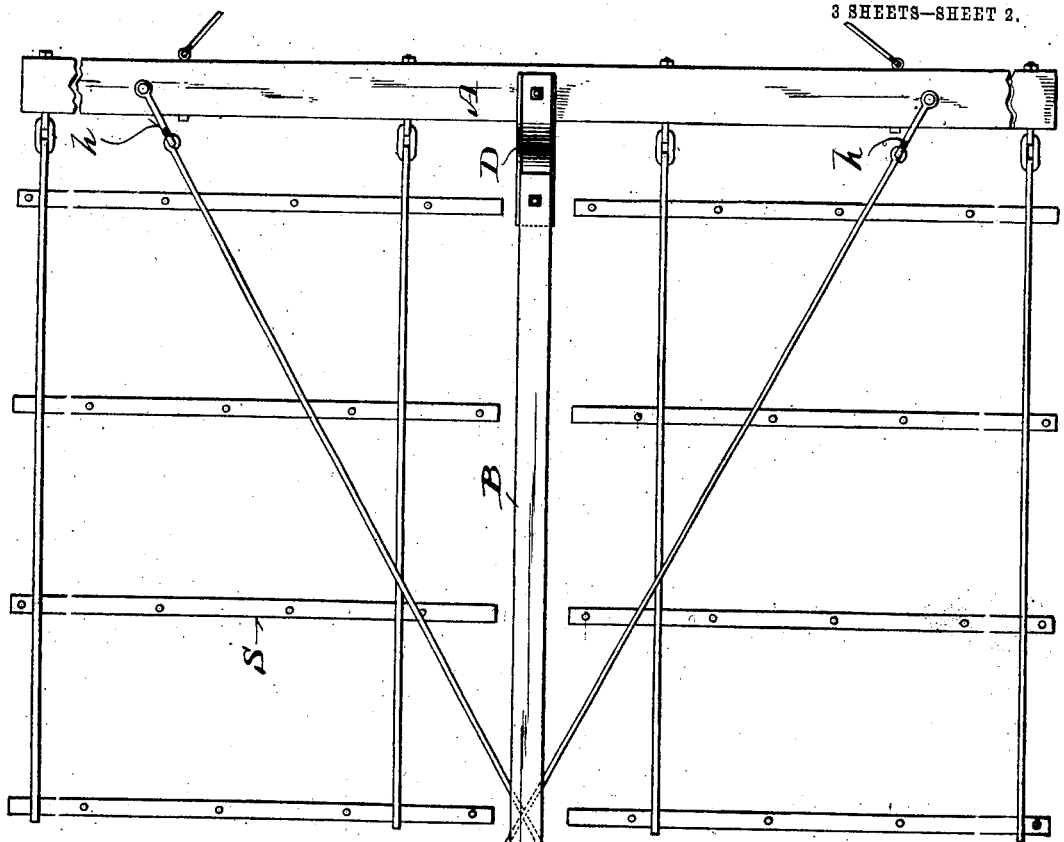
Fig. 2.
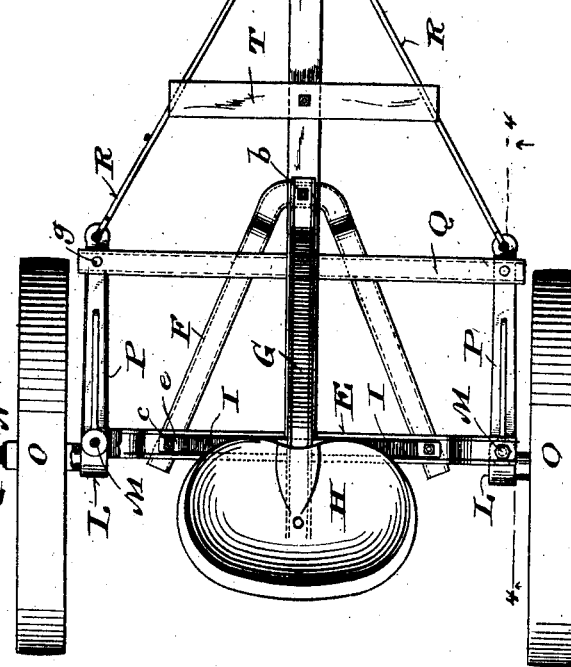
Witnesses:
George Felber,
Fred Palm.
Inventor:
Michael W. Neuens.
By Oliphant & Young,
Attorneys.

No. 826,867. PATENTED JULY 24, 1906.
M. W. NEUENS.
SULKY ATTACHMENT FOR HARROWS.
APPLICATION FILED NOV. 24, 1905.
3 SHEETS—SHEET 3.
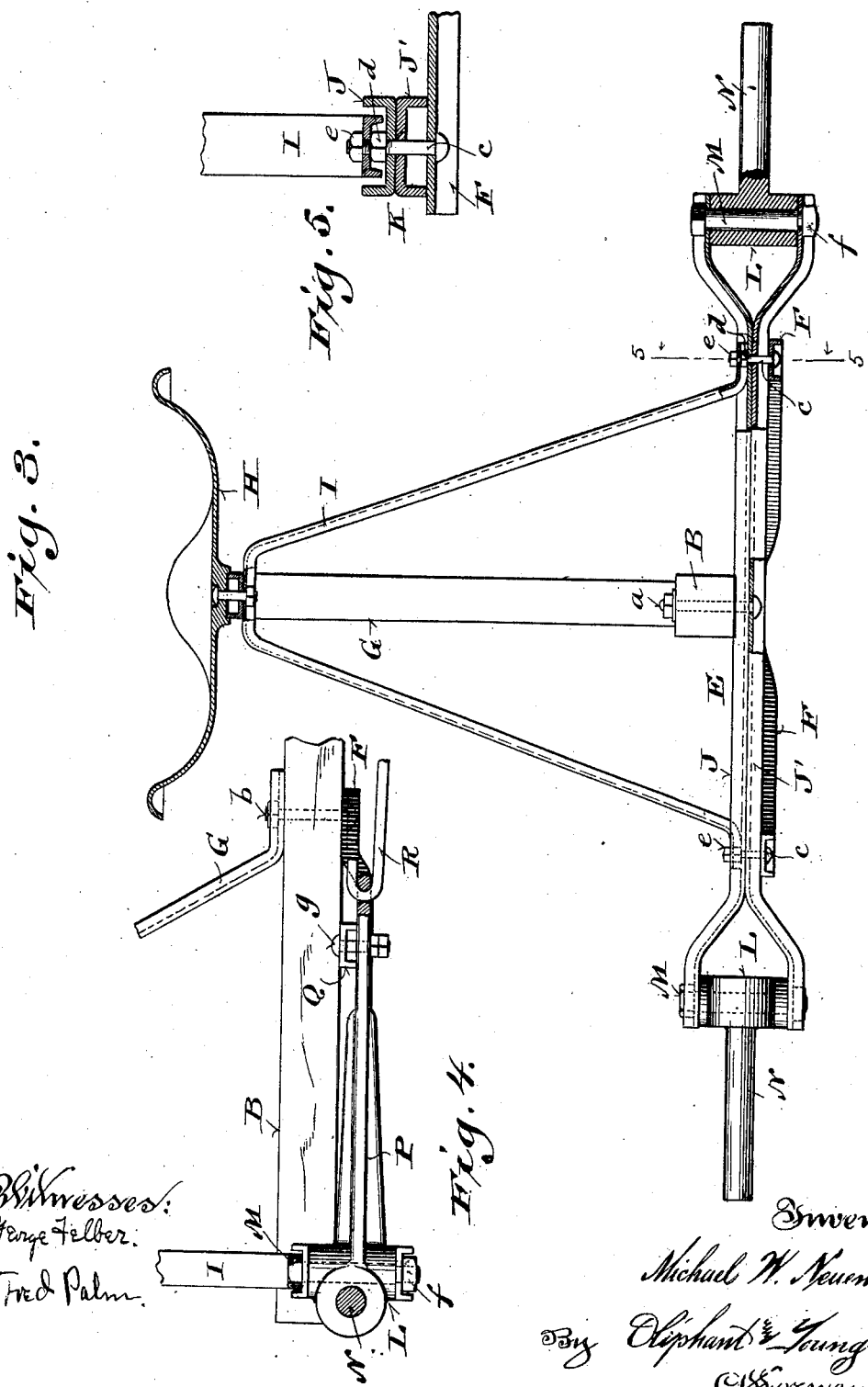

UNITED STATES PATENT OFFICE.

MICHAEL W. NEUENS, OF PORT WASHINGTON, WISCONSIN, ASSIGNOR TO WESTERN IMPLEMENT COMPANY, OF PORT WASHINGTON, WISCONSIN.

SULKY ATTACHMENT FOR HARROWS.

No. 826,867.     Specification of Letters Patent.     Patented July 24, 1906.

Application filed November 24, 1905. Serial No. 288,841.

*To all whom it may concern:*

Be it known that I, MICHAEL W. NEUENS, a citizen of the United States, and a resident of Port Washington, in the county of Ozaukee and State of Wisconsin, have invented certain new and useful Improvements in Sulky Attachments for Harrows; and I do hereby declare that the following is a full, clear, and exact description thereof.

The object of my invention is to provide a light, durable, and rigid steel-constructed sulky attachment for harrows, which owing to its peculiar lever connection with a drag-bar will follow the travel of said harrows when turning and not deflect the driver upon the seat from his normal position facing the team, said invention consisting in certain peculiarities of construction and combination of parts hereinafter fully set forth with reference to the accompanying drawings and subsequently claimed.

In the drawings, Figure 1 represents an elevation of a harrow-sulky embodying the features of my invention, having a harrow attached thereto, said view being shown with the axle and drag-bar in section to better illustrate the device; Fig. 2, a plan view of the same; Fig. 3, an enlarged detail rear elevation of the sulky-axle and its connections with parts broken away and in section to better illustrate the invention; Fig. 4, a detail sectional view on line 4 4 of Fig. 2, and Fig. 5 a detail cross-section of the axle on line 5 5 in Fig. 3.

Referring by letter to the drawings, A represents a drag-bar which is pivoted to the reach B through a depending bracket D, the latter being flanged and bolted to the end of said reach to form a rigid extension of the same. The rear end of the reach is secured to an angle-iron axle E by a bolt $a$, said axle and reach being braced by angle-iron hounds F, made fast to the under side of the reach by a bolt $b$, the rear ends being fast to the under side of the axle by bolts $c$ and nuts $d$, the said drag-bar, reach, and axle together forming a rigid running-gear. An angle-iron seat-supporting standard G is secured to the top of the reach by the bolt $b$ aforesaid, which, as stated, also secures the strip F thereto. This standard carries a seat H and is braced by a strap I, bolted to the upper end thereof and also to the axle E by the bolts $c$ and nuts $e$. As best illustrated in Figs. 3 and 5, the axle E is constructed of two bars J J', of U-iron, having their flat faces bolted together by the said bolts $c$, which, with the nuts $d$ $e$, also clamp the hounds F and brace-strap I. The bars J are further clamped by the bolt $a$, which passes up through them and secures the reach B, as stated. The ends of the bars J are spread apart to form spanners for the reception of swivel-blocks L, the latter being pivoted in said spanners by king-bolts M, upon which said swivel-cranks have horizontal motion. The king-bolts M are shouldered against the lower spanner-arms and threaded to receive nuts $f$, which serve to hold said bolts in place and at the same time bind the spanner-arms together without cramping the free movement of the swivel-blocks. The swivel-blocks are provided with studs N, projecting therefrom slightly to the rear of the king-bolts to facilitate traction of the wheels O, which are mounted upon said studs. Extending forward of said king-bolts from the aforesaid swivel-blocks are crank-arms P, that are at right angles to the studs N, and serve the purpose of guiding the sulky in the manner hereinafter described. The crank-arms P, together with the wheels O, are held parallel with each other by an angle-iron cross-bar Q, pivoted near the ends of said arms by bolts $g$, and this cross-bar is confined and supported by passing between the under side of the reach B and the upper face of the hounds F, thereby serving to increase the rigidity of the entire wheel-steering gear. The crank-arms P terminate in ears for the reception of steering-rods R, which are crossed and connected (upon opposite sides of the reach) to the drag-bar A by links $h$, and the harrows S, as shown, are similarly connected to said reach; but the means of attaching both the rods and harrows forms no part of my invention and may vary.

A suitable foot-rest T is secured to the reach B within convenient distance of the seat.

As best illustrated in Fig. 2, when a turn is made with my device the drag-bar will swing upon its pivot connection with the reach in the direction of the team, this action causing one of the rods to slacken and the opposite one to draw, thereby pulling its corresponding wheel forward at an angle to the sulky-frame and moving the opposite wheel at a corresponding angle backward, thus setting the wheels at the desired parallel angle with relation to the sulky-frame to describe a curve the radius of which is sufficient to steer the sulky around in the track of the harrows and maintain the proper relative position between the driver and team.

Having thus described my invention, what I claim as new, and desire to secure by Letters Patent, is—

1. In a sulky attachment for harrows, a running-gear comprising a rigidly-connected axle and reach, a seat secured thereto, a drag-bar pivoted to an end of the reach, swivel-blocks vertically pivoted to the ends of said axle, wheels mounted in connection with the swivel-blocks, and means connecting said swivel-blocks and drag-bar, whereby the wheels are positively actuated independent of the sulky-frame.

2. In a sulky attachment for harrows, a running-gear comprising a rigidly-connected axle and reach; a seat secured thereto, a drag-bar pivoted to an end of the reach, swivel-blocks vertically pivoted to the ends of said axle, wheels mounted in connection with the swivel-blocks, arms projecting from said swivel-blocks forward of their pivots, a bar connecting the arms, and means connecting the arms and drag-bar, whereby the wheels are positively actuated independent of the sulky-frame.

3. In a sulky attachment for harrows, a running-gear comprising a rigidly-connected axle and reach, a seat secured thereto, a drag-bar pivoted to an end of the reach, swivel-blocks vertically pivoted to the ends of the axle, lateral studs projecting from the swivel-blocks, wheels mounted upon the studs, crank-arms extending from said swivel-blocks forward of their pivots, a bar connecting the crank-arms, and cross-rods connecting the latter with the drag-bar upon opposite ends of the reach.

4. In a sulky attachment for harrows, a drag-bar, a reach pivoted thereto, a two-part axle having spanner ends and secured to the reach, hounds connecting the axle and said reach, seat-supports secured to said axle and the aforesaid reach, swivel-blocks pivoted in the spanner ends of the aforesaid axle, wheel-studs projecting from the swivel-blocks, crank-arms extending from the latter forward of their pivots, a bar connecting the crank-arms and arranged to rest upon said hounds, and cross-rods connecting said crank-arms and drag-bar upon opposite sides of the reach.

5. In a sulky attachment for harrows, a reach, a two-part axle centrally bolted thereto, hounds secured to the reach forward of the axle and having their ends extending backward and intersecting the said axle, a seat-support arranged to rest at each end upon the axle, and bolts for securing said seat-support, hound ends and two-part axle together.

In testimony that I claim the foregoing I have hereunto set my hand, at Port Washington, in the county of Ozaukee and State of Wisconsin, in the presence of two witnesses.

MICHAEL W. NEUENS.

Witnesses:
EDWARD BARELMAN,
AUG BOERGER.